UNITED STATES PATENT OFFICE.

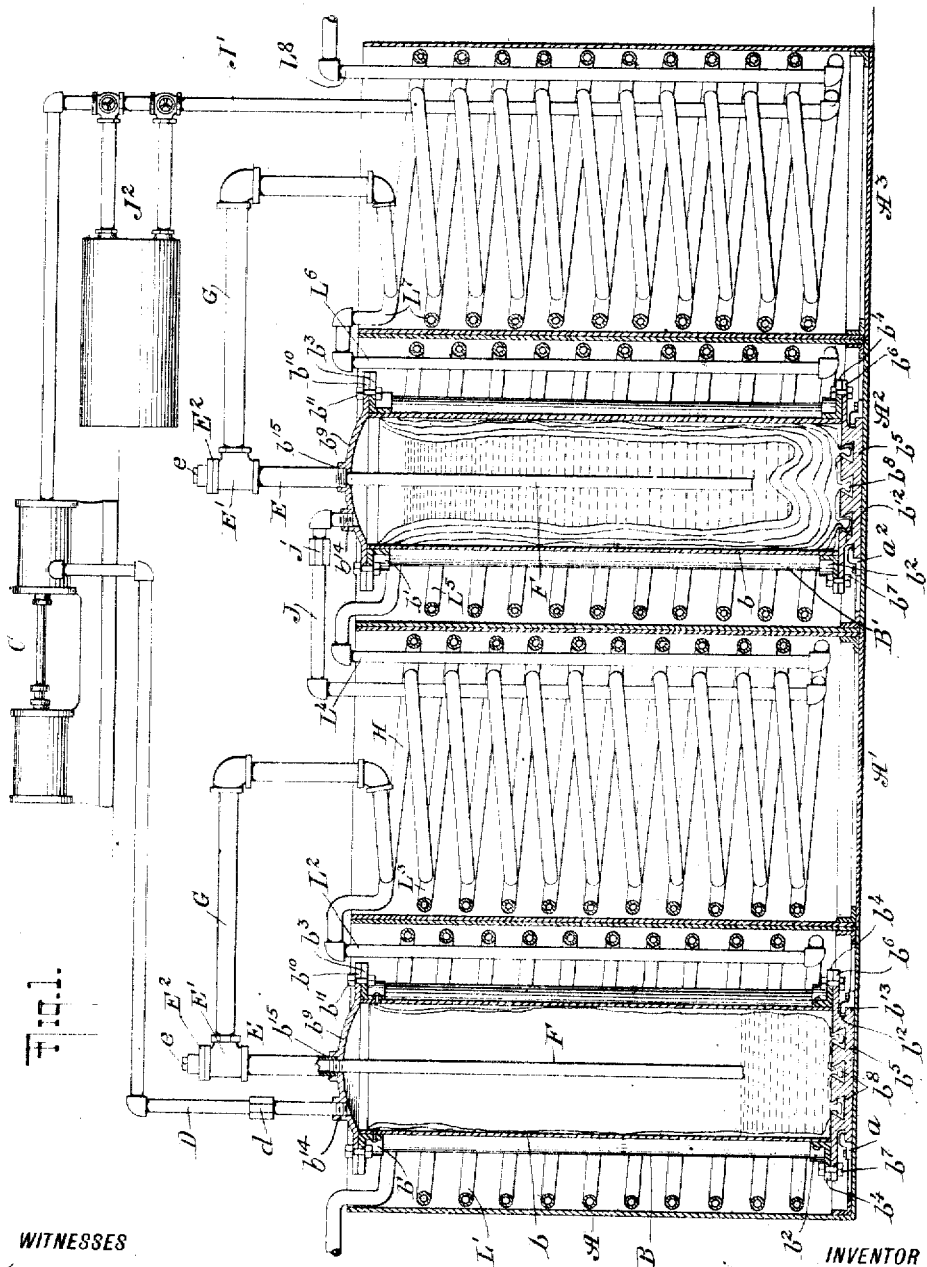

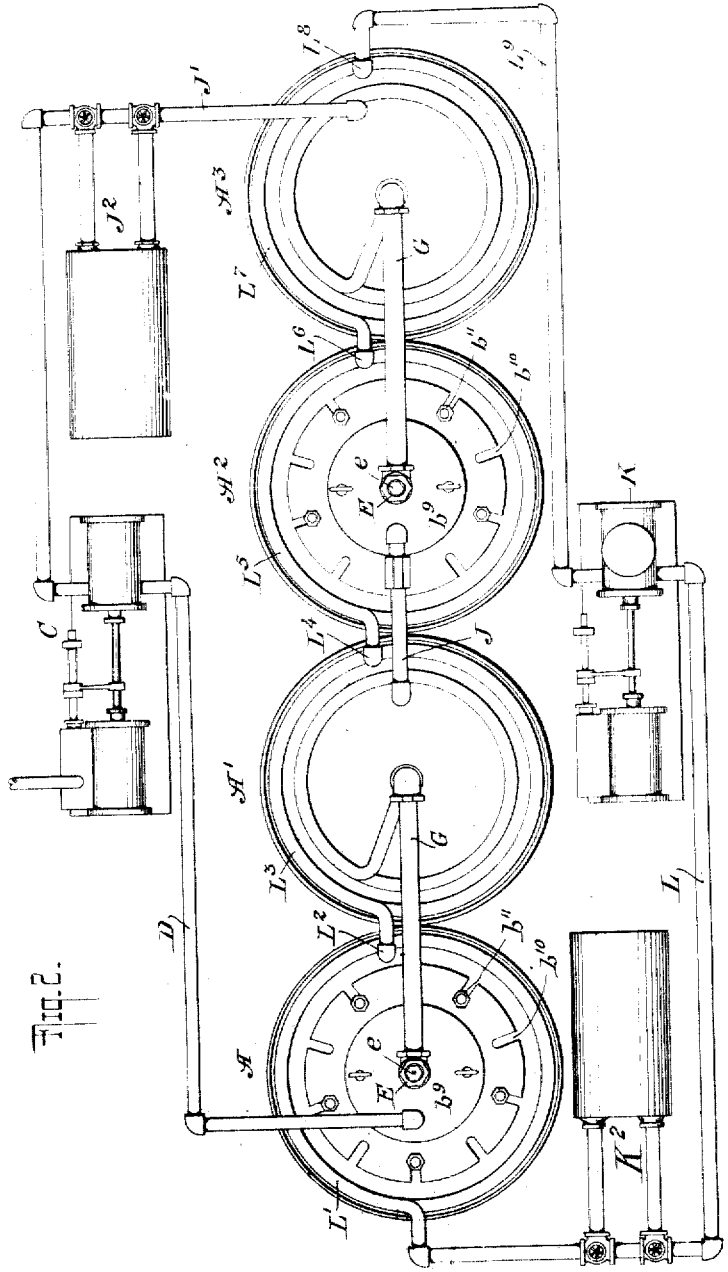

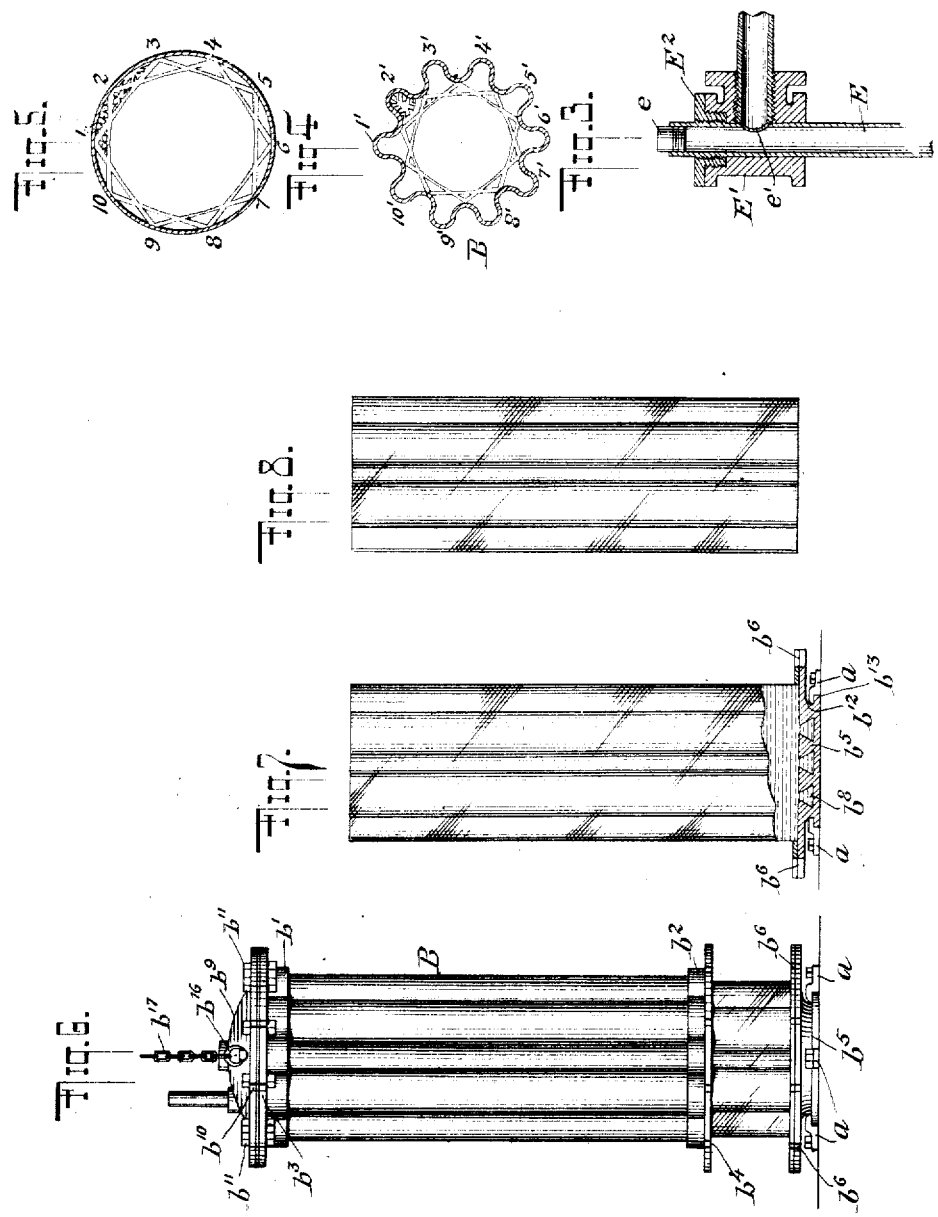

WILLARD O. FELT, OF BRADFORD, PENNSYLVANIA.

PROCESS OF FREEZING WATER.

1,271,879.  Specification of Letters Patent.  Patented July 9, 1918.

Application filed June 7, 1912, Serial No. 702,231. Renewed September 8, 1917. Serial No. 190,380.

*To all whom it may concern:*

Be it known that I, WILLARD O. FELT, a citizen of the United States, and resident of Bradford, county of McKean, and State of Pennsylvania, have invented certain new and useful Improvements in Processes of Freezing Water, of which the following is a specification.

My invention relates to a process for freezing water for the purpose of making ice for commercial and domestic uses. In the processes heretofore employed either in the "plate" or "can" method the heat which must be extracted from the water to reduce it to the freezing point, and the latent heat given off in the act of freezing has all been compelled to pass through the gradually thickening shell or layer of ice, which, as is well known, is a poor conductor of heat, with the result that much time is consumed before the water is frozen solid. Furthermore in some processes where the water to be frozen is previously treated and boiled to remove impurities and air, it is sometimes impossible to remove all traces of the substances used to precipitate the impurities. If this is the case, such ice often retains a "tang" and usually melts more readily than other ice. On the other hand when using pure water without boiling, or other treatment the ice formed is usually very porous or filled with numerous air bubbles which give a milky appearance to the ice, and in "can" ice the center of the block is frequently hollow.

By my improved process I overcome these objections by first freezing a shell of ice around the inside of the cans or vessels and then circulating the water to be frozen in the cans, through coils cooled below the freezing point of water so as to quickly reduce the temperature of the water to the freezing point or slightly below and while the water is circulating through the cans and coils gradually build up the cakes or shells of ice in the cans, which will be done by the freezing of layer upon layer of ice on the inside of the shell. Air at a low temperature is also used to assist in reducing the temperature as well as agitating the water to prevent the formation of bubbles in the ice. When the shell of ice in the cans becomes sufficiently thick and the temperature of the circulating water is at or slightly below the freezing temperature of 32° F., the circulation is stopped and as soon as the water in the cans or vessels within the shell of ice becomes quiescent it will quickly freeze solid to the center. By this process the ice blocks are formed without air bubbles and hence clear as crystal and solid to the center.

One form of apparatus for carrying out my improved process is disclosed in the accompanying drawings in which—

Figure 1 is a longitudinal vertical section through the apparatus, the pump connections being indicated diagrammatically.

Fig. 2 is a plan view, partially diagrammatic.

Fig. 3 is a sectional view of a detail.

Fig. 4 is a horizontal section of my improved vessel in which ice is formed, indicating how the needles of ice are formed therein.

Fig. 5 is a section of the circular form of vessel showing how the ice is formed in such vessel.

Fig. 6 is a view of one of my corrugated vessel showing how the ice is formed in such ice therein.

Fig. 7 represents the block of ice still attached to the bottom plate of the can after stripping off the can, and Fig. 8 represents a block of ice.

It is a well known fact that ice forming in a pond or vessel is accomplished by first lowering the temperature of the water to the point of its greatest density 39° F. during which time or until the water reaches this temperature the currents in the water move downward and then as the temperature continues to fall, the colder water being lighter will stay at or rise to the top of the pond or vessel where as the freezing point is reached the water starts to freeze by throwing out crystals or needles of ice from the sides of the pond or vessel. When ice forms in a round vessel the needles of ice start from the points 1 to 10 of a decagon as shown in Fig. 5 of the drawings. These needles will at first extend to the point of the pentagon of the series say for example 2 and 3 will then send out needles at right angles as shown in the diagram. When, however, the sides of a vessel are corrugated decagonally as shown in Fig. 4, the needles will commence at the inside points of the corrugations much sooner, about one-half the time that it takes to form in a circular vessel and these needles will form much more rapidly in a corrugated vessel than in a circular vessel. This is because in the corrugated vessel for the same diameter we have much greater surface in actual contact with the freezing mixture and on which the needles will form. In a corrugated vessel as shown in Fig. 4 of the drawing, the corrugations 1' to 10' will fill up with ice needles, let us say in from twenty minutes to half an hour, whereas in a circular vessel it would take about three hours to cover the inside of the vessel with a thin coating or shell of ice. For this reason in carrying out my invention I prefer to use a corrugated vessel in which to form the ice.

As is well known ice is a poor conductor of heat, therefore in freezing ice from the outside toward the center it forms very slowly. I have discovered that when the ice begins to form the heat can be more quickly and readily removed from the inside of the shell and the artificial ice can be made much quicker and cheaper by freezing it on the inside than attempt to freeze it from the outside toward the center.

I will now describe in detail my improved apparatus for carrying out my process which consists as may be broadly stated in forming a shell of ice around a body of water, removing the water from the shell, lowering the temperature of the removed water to the freezing point and then forcing the water back into the ice shell and permitting the water to freeze solid to the center.

The parts lettered A, A', A² and A³ on the drawings represent a series of tanks open at the top. While I have shown four of such tanks there may be a greater or less number as desired, it being understood of course from the following description that it is necessary to have an even number of such tanks always. The bottom of every alternate tank A and A² is provided on its inner face with pivoted buttons or catches $a$ and $a^2$. B and B' are the vessels in which the ice is formed. The sides $b$ of these vessels are corrugated vertically and the top and bottom edge of each is provided with a band $b'$ and $b^2$ which fits in said corrugated sides. Each of these bands has radial slots $b^3$ and $b^4$ into which are fitted bolts by which the top and bottom of the vessel is secured. The bottom $b^5$ of the vessel consists of a thick plate circular in form having radial slots $b^6$ therein which register with the slots $b^4$. The bolts $b^7$ enter said radial slots and fasten the bottom to the vessel. The inner face of the bottom of the vessel is provided with undercut or dove tailed recesses $b^8$. The top of the vessel consists of a dome shaped plate $b^9$, provided with radial slots $b^{10}$ which register with the slots $b^3$. $b^{11}$ are bolts which pass through this slot to hold the top on the vessel. Gaskets may be placed between bands $b'$ and $b^4$ and the top and bottom of the vessel so as to make the joint perfectly tight. The bottom of each vessel is provided with an undercut recess $b^{12}$ forming a circular flange $b^{13}$ against which the buttons $a$ are clamped to hold the vessel in the tank. The top of each vessel is provided with a screw threaded opening $b^{14}$ and an outlet $b^{15}$. C represents a pump of any well known construction. D is a supply pipe leading from said pump, one end of which is screw threaded into the opening $b^{14}$. $d$ is a coupling by which one section of the pipe is coupled or disconnected. E is a short section of pipe screw-threaded into the outlet opening $b^{15}$ and closed at one end by a plug $e$. The upper end of this pipe has fitted to it a T marked E', the said T being secured to the pipe by the external and internal screw-threaded glands $E^2$. This pipe E has an opening $e'$ therein which registers with the opening in the T. F is a pipe which is screw-threaded into the opening $b^{15}$ and into the opening in the end of the pipe E. This pipe F projects into vessel B nearly to the bottom. G is a pipe which is screw-threaded into E' and is coupled as shown to a coil H which is inserted into the tank A' or A³. This coil is connected to a pipe J which is connected to the inlet $b^{14}$ of the tank B', said pipe being provided with a coupling $j$ by which the pipe J can be disconnected so that the vessel B' may be removed from the tank. The last coil in the series is connected by a pipe J' to the pump C. The introduction of the cold air into the pump circuit may be accomplished in any preferred manner and at any convenient point, as for instance by suitable valve connections at J². The method of cooling the air is not shown and any well known method may be employed. K is a pump which has the pipe L leading therefrom. This pipe L is formed into a coil L' in the first tank which surrounds the vessel B. L² is a pipe which is connected to the bottom of this coil and leads up into the next tank A' where it is formed into another coil L³. L⁴ is a pipe attached to the bottom of this coil, which leads vertically into this tank and is connected to another coil L⁵ in the tank A² which surrounds the second vessel B'. L⁶ is another pipe extending vertically into this tank and connected to another coil L⁷ in the tank A³. This last coil is connected by the vertical pipe L⁸ to the lead pipe L⁹ which leads to the pump K. The alcohol and water or suitable brine solution circulated by the pump K through the pipes and coils connected therewith is cooled to the requisite temperature by any well known method, the apparatus for which may be introduced at any desired point of the system as for instance at K² in Fig. 2.

Having now described the different parts of my apparatus, the manner of operating it to carry out my process will now be set forth. The vessels B and B' are inserted in the tanks A and A² and secured in place by the buttons $a$. These vessels are now filled with water and the tops secured thereto. The pipes E and F are then fastened to the top as heretofore described. The pipes D and J are coupled to the inlet pipe in each of these vessels. The tanks $A'$ and $A^3$ are filled with a mixture of chlorid of calcium solution which is at about a temperature of 0° F. and the tanks A and $A^2$ are filled with brine or an ordinary salt solution at about 15° F. The pipes L and coils $L'$ are then filled with water containing a small quantity of alcohol or other non-freezing substance to prevent the water from freezing at a lower temperature while the apparatus is in operation. The pump K is started and the non-freezing mixture is circulated through the cooling apparatus $K^2$, and the system of pipes L and coils $L'$. As it circulates it will reduce the temperature of the water in the vessels B and $B'$, the initial temperature of which is usually 60 to 70° F. and a film or shell of ice will form around the water. Or by reversing the pump C and taking air cooled to 0° F. or below and forcing it through the pipes $J'$, coils H and vessels B, $B'$ in the reverse direction, that is, have the cold air enter the pipes E and bubble up through the water and pass out through the opening $b^{14}$ and will thus rapidly cool the water until the shell of ice begins to form. When this shell of ice is formed, air under pressure and at a temperature of at least 0° F. is forced through the pipes D by the air pump C into the vessel B which drives out the water in this vessel through the pipe F. It is to be understood that the air forced through the pipe D at 0° F. is cooled to that point by any well known method, the apparatus for which is diagrammatically indicated at $J^2$. The expansion of the air upon entering this vessel and performing work to force the water out of the vessel through the pipe F will lower the temperature of the water in this vessel. The water at this lowered temperature is forced through the pipe G, through the coil H and through the pipe J into the other vessel $B'$ placed in the third tank $A^2$, which forces the water out of that vessel through the other pipe G, through coil H, and through pipe $J'$, the pump C assisting the circulation of this water through these pipes and driving the cold water back through the pipe D to the first vessel B. As the water leaves the tank at a lower temperature another thin shell of ice will be formed on the inner surface of the first shell. When the circulation continues another shell will be formed on the inner shell in the vessel $B'$ and a series of shells will be formed in all of the vessels in the system as the water circulates. While this operation of circulating the water is continued, the heat will be continuously extracted until all of the water circulated through these pipes and through the vessels has been reduced to a temperature of 32° F. or slightly lower. If the water is kept in constant motion through these pipes it will not freeze solid to the center. When the temperature of the water, however, has been reduced to 32° F. or lower I stop the pump and withdraw the pipes F from the vessels. This is done by removing all the couplings, the gland $E^2$ from the part $E'$ and withdrawing the pipes E which are arranged to carry the pipe F with it. As soon as this is done the water in each of these vessels will become quiet and freeze solid to the core without any milky or white parts or streaks in the center as is the case in ordinary artificial ice. If desired, the entire circulation system including the pump C, pipes D, J and $J'$, vessels B, $B'$ and coils H may be filled with water which will be circulated by the pump C until its temperature is at or below 32° F. and thereafter it may be kept in circulation until the shells of ice in the vessels or cans B $B'$ have attained sufficient thickness; after which the pipes E are removed as described above and the water will freeze solid to the center.

To remove the cake of ice that has been frozen in the vessels B or $B'$, the pipes D and J are uncoupled from the top of these vessels and a hoisting apparatus is fastened to the eye bolts $b^{16}$ and the vessel lifted from the tank, it being understood of course that the buttons $a$ are turned to permit this. The bottom can be uncoupled from the sides and the top lifted longitudinally off of the cake of ice in any manner preferable.

In order to keep the water that remains in the coils H and the pipes connected thereto from freezing owing to the quiescent state of the water when the vessels B and $B'$ are removed from the tanks A and $A^2$ to obtain the solid body of ice frozen in these vessels, the water in the coils may be forced out by air under pressure from the pump C or other source.

I may connect to the pipes D and J a high pressure air pump which will force compressed air into the vessels B and $B'$ and when the apparatus is in operation, the air passing through these pipes under high pressure and mingling with the water in circulation will throw the water coming through the pipes D and J into the vessels B and $B'$ in a spray and as this air expands as it enters the vessel will also greatly lower the temperature of the water and cause the ice to form in sheets or shells on the inside of the shells already formed.

My invention is intended to supply and employ very much lower temperature both externally and internally and through every part of the mass to attain the desired result of homogeneous and solid ice in a very short time.

While I have shown one type of apparatus for carrying out my invention, it is to be understood that I do not limit myself to said apparatus as many other types of apparatus may be used for effecting my process, and various changes may be made in the form of apparatus shown without departing from my invention.

I claim:

1. The herein described process of forming ice which consists in freezing a shell of ice around a body of water, then lowering the temperature of the inclosed water below the freezing point before it is permitted to freeze.

2. The herein described process of forming ice which consists in freezing a shell of ice around a body of water then lowering the temperature of the ice shell and of the water below the freezing point before the water within the ice shell is permitted to freeze.

3. The herein described process of forming ice which consists in freezing a shell of ice around a body of water then withdrawing the water lowering its temperature below the freezing point and again introducing it into the shell of ice and permitting it to freeze.

4. In the process of forming ice, forming a shell of ice around a body of water, removing the water from the shell, lowering the temperature of the water below the freezing point, returning the water to the inside of the shell and forming another shell of ice within the first shell.

5. In the process of forming ice which consists in forming a shell of ice around a body of water, removing the water from the shell, lowering the temperature of the water below the freezing point, returning the water to the shell, and permitting the water to remain quiet in the shell so that it will freeze solid forming a homogeneous body of ice.

6. The process of forming ice which consists in freezing the outer surface of a body of water into a shell of ice, removing the water from the shell lowering the temperature of the water, returning the water to the shell, forming another shell within the first shell, removing again the water from the shell, further lowering the temperature of the water, returning the water to the shell, permitting the water to remain quiet in the shell so that the water will form into a solid body of ice.

7. The process of forming ice which consists in confining a body of water in a closed vessel, freezing the outer surface of the said body of water to form a shell of ice, forcing air under pressure and at a lower temperature on the water within the shell and thereby removing the water from the shell, lowering the temperature of the water to the freezing point, returning the water to the shell and permitting the water to remain quiet in the shell, so that it will form into a body of ice.

8. Producing a shell of ice by cooling the water in a closed vessel, withdrawing the water by forcing cold air under pressure on top of said water, lowering the temperature of the water and of the ice so formed, removing the water from the vessel and successively returning the water to the vessel under forced pressure whereby the water will enter the vessel in a spray and be converted into ice and form on the ice previously formed in the vessel as and for the purposes set forth.

9. The process of converting a liquid into a solid form, which comprises freezing a body of liquid by first freezing the outer portion, then successively depositing the liquid at a temperature below the freezing point on the walls of the previously frozen portion, and freezing the deposited liquid.

10. The process of converting a liquid into a solid form, which comprises freezing the outer portions of a body of liquid, removing the inner unfrozen liquid, lowering the temperature of the removed liquid and replacing the liquid of lowered temperature in contact with the frozen portion and permitting it to freeze.

11. The herein described process of forming ice, which consists in freezing a shell of ice around a body of water, then causing the water to circulate, lowering the temperature of the circulating water below the freezing point, stopping the circulation, and permitting the water to freeze.

12. The herein described process of forming ice, which consists in freezing a shell of ice around a body of water, causing the water to circulate from and back into the interior of said shell, lowering the temperature of the water below the freezing point while circulating, and then stopping the circulation and permitting the water to freeze.

In testimony whereof I have hereunto set my hand in the presence of two subscribing witnesses.

WILLARD O. FELT.

Witnesses:
M. H. LOCKWOOD,
JOHN A. KEHLENBECK.